United States Patent
Butler et al.

(10) Patent No.: US 11,114,812 B2
(45) Date of Patent: Sep. 7, 2021

(54) OPTICAL TUBE WAVEGUIDE LASING MEDIUM AND RELATED METHOD

(71) Applicant: Corning Incorporated, Corning, NY (US)

(72) Inventors: Douglas Llewellyn Butler, Painted Post, NY (US); Daniel Warren Hawtof, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/719,058

(22) Filed: Dec. 18, 2019

(65) Prior Publication Data

US 2020/0127435 A1    Apr. 23, 2020

Related U.S. Application Data

(62) Division of application No. 15/485,836, filed on Apr. 12, 2017, now Pat. No. 10,574,021.

(Continued)

(51) Int. Cl.
*H01S 3/067*    (2006.01)
*C03C 13/04*    (2006.01)
(Continued)

(52) U.S. Cl.
CPC ...... *H01S 3/06729* (2013.01); *C03B 19/1453* (2013.01); *C03B 19/1469* (2013.01);
(Continued)

(58) Field of Classification Search
CPC .... H01S 3/06729; H01S 3/176; H01S 3/1603; H01S 3/063; H01S 3/06733; G02B 6/032;
(Continued)

(56) References Cited

U.S. PATENT DOCUMENTS

| 4,190,814 A |   | 2/1980 | Van Workum |
| 4,599,098 A | * | 7/1986 | Sarkar ............... C03B 37/01466 |
|             |   |        | 65/421 |

(Continued)

FOREIGN PATENT DOCUMENTS

| CN | 1148573 A    | 4/1997 |
| CN | 101969170 A  | 2/2011 |

(Continued)

OTHER PUBLICATIONS

Jing et al., "A simple way to establish a dual-core hollow fiber for laser surgery applications," Proc. SPIE 9702, Optical Fibers and Sensors for Medical Diagnostics and Treatment Applications XVI, 97020D (Mar. 7, 2016) (Year: 2016).*

(Continued)

*Primary Examiner* — Xinning (Tom) Niu
(74) *Attorney, Agent, or Firm* — Amy T. Lang; John P. McGroarty (57) ABSTRACT

Laser waveguides, methods and systems for forming a laser waveguide are provided. The waveguide includes an inner cladding layer surrounding a central axis and a glass core surrounding and located outside of the inner cladding layer. The glass core includes a laser-active material. The waveguide includes an outer cladding layer surrounding and located outside of the glass core. The inner cladding, outer cladding and/or core may surround a hollow central channel or bore and may be annular in shape.

10 Claims, 5 Drawing Sheets

Related U.S. Application Data (60) Provisional application No. 62/336,140, filed on May 13, 2016, provisional application No. 62/336,126, filed on May 13, 2016.

(51) Int. Cl.

| | | |
|---|---|---|
| *C03B 19/14* | (2006.01) | |
| *C03B 23/023* | (2006.01) | |
| *C03B 33/06* | (2006.01) | |
| *C03B 23/051* | (2006.01) | |
| *C03C 3/06* | (2006.01) | |
| *H01S 3/063* | (2006.01) | |
| *H01S 3/16* | (2006.01) | |
| *G02B 6/036* | (2006.01) | |
| *G02B 6/032* | (2006.01) | |
| *H01S 3/17* | (2006.01) | |

(52) U.S. Cl.
CPC ........ *C03B 19/1492* (2013.01); *C03B 23/023* (2013.01); *C03B 23/051* (2013.01); *C03B 33/06* (2013.01); *C03C 3/06* (2013.01); *C03C 13/045* (2013.01); *H01S 3/063* (2013.01); *H01S 3/06733* (2013.01); *C03B 2201/12* (2013.01); *C03B 2201/28* (2013.01); *C03B 2201/30* (2013.01); *C03B 2201/31* (2013.01); *C03B 2201/32* (2013.01); *C03B 2201/34* (2013.01); *C03B 2201/36* (2013.01); *C03B 2201/42* (2013.01); *C03B 2207/60* (2013.01); *C03C 2201/10* (2013.01); *C03C 2201/12* (2013.01); *C03C 2201/14* (2013.01); *C03C 2213/00* (2013.01); *G02B 6/032* (2013.01); *G02B 6/03605* (2013.01); *H01S 3/1603* (2013.01); *H01S 3/176* (2013.01)

(58) Field of Classification Search
CPC ............ G02B 6/03605; C03C 2201/10; C03C 2201/12; C03C 2201/14; C03C 2213/00; C03C 3/06; C03C 13/045; C03B 2201/30; C03B 2201/34; C03B 33/06; C03B 19/1453; C03B 19/1469; C03B 19/1492; C03B 23/023; C03B 23/051; C03B 2201/32; C03B 2201/28; C03B 2201/12; C03B 2201/36; C03B 2201/31; C03B 2201/42; C03B 2207/60
See application file for complete search history.

(56) References Cited

U.S. PATENT DOCUMENTS

| | | | |
|---|---|---|---|
| 5,867,305 | A | 2/1999 | Waarts et al. |
| 6,192,713 | B1 | 2/2001 | Zhang et al. |
| 6,512,879 | B1 | 1/2003 | Beguin et al. |
| 6,546,760 | B1 | 4/2003 | Tsuchiya et al. |
| 6,928,224 | B2 | 8/2005 | Beall et al. |
| 7,006,742 | B2 | 2/2006 | Takahashi et al. |
| 7,215,858 | B2 * | 5/2007 | Po .................. G02B 6/03611 385/123 |
| 7,356,233 | B2 | 4/2008 | Fini |
| 7,792,161 | B2 | 9/2010 | Hongo |
| 7,983,312 | B2 | 7/2011 | Shkunov et al. |
| 8,111,452 | B2 | 2/2012 | Butler et al. |
| 8,710,470 | B2 | 4/2014 | Gattass et al. |
| 8,977,097 | B2 | 3/2015 | Filgas |
| 2002/0114607 | A1 | 8/2002 | Bagnasco et al. |
| 2005/0076680 | A1* | 4/2005 | Shin .................. C03B 37/0142 65/421 |
| 2005/0092030 | A1* | 5/2005 | Balakrishnan ...... C03B 37/0142 65/421 |
| 2005/0157998 | A1 | 7/2005 | Dong et al. |
| 2005/0201715 | A1 | 9/2005 | Ellwood |
| 2006/0088261 | A1 | 4/2006 | Berkey et al. |
| 2009/0180511 | A1* | 7/2009 | Muendel ............. G02B 6/2552 372/99 |
| 2011/0188825 | A1 | 8/2011 | Alkeskjold |
| 2012/0044966 | A1 | 2/2012 | Stoppel et al. |
| 2014/0247845 | A1 | 9/2014 | Armbruster et al. |

FOREIGN PATENT DOCUMENTS

| | | |
|---|---|---|
| CN | 102244338 A | 11/2011 |
| CN | 102347733 A | 2/2012 |
| CN | 102621628 A | 8/2012 |
| CN | 102780152 A | 11/2012 |
| CN | 104678489 A | 6/2015 |
| EP | 472735 A1 | 3/1992 |
| GB | 449689 A | 7/1936 |
| GB | 2449689 A | 12/2008 |
| JP | 03190036 B2 | 7/2001 |
| WO | 1999032413 A1 | 7/1999 |
| WO | 2010056253 A1 | 5/2010 |
| WO | 2017034904 A1 | 3/2017 |

OTHER PUBLICATIONS

H.J. Baker et al., "Planar and Annular Waveguide Lasers", Lasers and Electro-Optics Society Annual Meeting, 1996. LEOS 96., IEEE, vol. 2, pp. 395-396.

International Search Report and Written Opinion of the European International Seaching Authority, PCT/US2017/032123, dated Nov. 27, 2017, 22 Pgs.

Invitation to Pay Additional Fees From the International Searching Authority; PCT/US2017/032123; dated Aug. 10, 2017; 14 Pages; European Patent Office.

Jing et al., "A simple way to establish a dual-core hollow fiber for laser surgery applications," Proc. SPIE 9702, Optical Fibers and Sensors for Medical Diagnostics and Treatment Applications XVI, 970200 (Mar. 7, 2016).

U.S. Appl. No. 62/131,283, filed Mar. 11, 2015.

Enlgish Translation of CN2017800296303 Office Action dated Mar. 30, 2020; 10 Pages; Chinese Patent Office.

Chinese Patent Application No. 201780029630.3 Second Office Action dated Nov. 10, 2020; 12 Pages; (8 Pages of English Translation and 4 Pages of Original Document) Chinese Patent Office.

\* cited by examiner

OPTICAL TUBE WAVEGUIDE LASING MEDIUM AND RELATED METHOD

This application is a divisional and claims the benefit of priority under 35 U.S.C. § 120 of U.S. patent application Ser. No. 15/485,836, filed on Apr. 12, 2017, which claims the benefit of priority under 35 U.S.C. § 119 of U.S. Provisional Application Ser. No. 62/336,140 filed on May 13, 2016 and of U.S. Provisional Application Ser. No. 62/336,126 filed on May 13, 2016, the content of which is relied upon and incorporated herein by reference in its entirety.

BACKGROUND

The disclosure relates generally to the field of lasers, and specifically to glass laser waveguides and related methods for forming glass laser waveguides. Silica soot may be generated by a process, such as flame hydrolysis. The silica soot may then be sintered to form a glass article such as a waveguide. Some solid state lasers utilize a waveguide including a solid material supporting a laser active material which generates coherent light when stimulated with an energy source, such as a diode.

SUMMARY

One embodiment of the disclosure relates to a laser waveguide lasing medium. The laser waveguide lasing medium includes an inner cladding layer surrounding a central axis and a glass core surrounding and located outside of the inner cladding layer. The glass core includes a laser-active material. The laser waveguide lasing medium includes an outer cladding layer surrounding and located outside of the glass core.

An additional embodiment of the disclosure relates to a laser waveguide including an inner cladding layer surrounding a hollow central bore that extends between opposing first and second ends along a length of the waveguide. The laser waveguide includes a laser gain medium surrounding and located outside of the inner cladding layer, and the laser gain medium includes a glass material doped with a laser-active material. The laser waveguide includes an outer cladding layer surrounding and located outside of the laser gain medium. An index of refraction of the inner cladding material is less than an index of refraction of the laser gain medium, and an index of refraction of the outer cladding material is less than the index of refraction of the laser gain medium.

An additional embodiment of the disclosure relates to a method of forming a laser waveguide. The method includes delivering a first stream of glass soot particles from a soot generating device to a target rod such that a first layer of glass soot particles is formed surrounding the target rod. The method includes delivering a second stream of glass soot particles from the soot generating device toward the target rod after formation of the first layer of glass soot particles, and the second stream of glass soot particles forms a second layer of glass soot particles and includes a laser-active material. The method includes delivering a third stream of glass soot particles from the soot generating device toward the target rod after formation of the second layer of glass soot particles such that a third layer of glass soot particles is formed. The method includes sintering the first, second and third layers of glass soot particles such that first, second and third sintered glass layers are formed from the first, second and third glass soot layers, respectively.

An additional embodiment of the disclosure relates to a laser system including a laser waveguide. The laser waveguide includes an inner cladding layer surrounding a central axis, a glass core including a laser-active material surrounding and located outside of the inner cladding layer, and an outer cladding layer surrounding and located outside of the glass core. The laser system includes a power source and input coupling optics coupling the power source to the laser waveguide. The laser system includes an optical feedback system coupled to the laser waveguide, and an output coupler coupled to the laser waveguide.

An additional embodiment of the disclosure relates to a method for forming a laser waveguide. The method includes forming a glass waveguide tube. The waveguide tube includes an inner cladding layer surrounding a hollow central channel that extends between opposing first and second ends along a length of the waveguide and a laser gain medium surrounding and located outside of the inner cladding layer. The laser gain medium includes a glass material doped with a laser-active material. The method includes cutting a section from the glass waveguide tube. The section includes a portion of the inner cladding layer, a portion of the laser gain medium and a curvature in a circumferential direction measured in a plane perpendicular to a longitudinal axis of the section. The method includes heating the section of the glass waveguide tube to a temperature above a softening temperature of the glass material. The method includes shaping the curved section of the glass waveguide while above the glass transition temperature, and the curvature in the circumferential direction is decreased during shaping.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Referring generally to the figures, various embodiments of a laser waveguide and related systems and methods for forming a laser waveguide are shown. In various embodiments discussed herein, the laser waveguide includes an inner cladding layer, a glass core including a laser-active material (e.g., neodymium, ytterbium, erbium, etc.) surrounding the inner cladding layer, and an outer cladding layer surrounding the glass core. In some embodiments, the inner cladding layer surrounds a hollow area (e.g., a hollow bore, a central channel, etc.) that extends the length of the waveguide, and in some such embodiments, the inner cladding layer and the glass core may have an annular cross-sectional shape. In various embodiments, it is believed that the inner cladding, laser core, and outer cladding arrangement discussed herein may provide a variety of benefits, including improved ability for the pumping laser diode to deliver light into the waveguide and to increase the fraction of output light that is emitted in the lowest-order mode. Additionally, the hollow central channel may provide various benefits including providing a central area to receive a cooling fluid to transfer heat from the laser active glass core during laser operation.

Further, various embodiments of the disclosure relate to a method of forming a laser waveguide. As discussed herein, a glass soot generating device is positioned to deliver glass soot particles (e.g., silica soot particles) on to a target rod (e.g., an alumina target rod). Different soot layers including the appropriate materials or dopants for each layer are deposited in sequence for the formation of the inner cladding, the laser core and the outer cladding. Each soot layer is sintered forming a sintered inner cladding layer, a sintered glass core, and a sintered outer cladding layer. Following sintering, the sintered, multilayered article is heated and stretched (e.g., via a redraw process) to form an elongate annular waveguide having an inner cladding, a laser active core outside of the inner cladding and an outer cladding surrounding the laser active core which all surround the hollow central area that results from the removal of the target rod.

In particular embodiments, during soot deposition, the target rod rotates about its central axis, and relative translation movement between the soot generation device and the target rod is provided. Further, in particular embodiments, the size of the soot stream is relatively small compared to the diameter of the target rod and/or the diameter of the soot layers being formed. It is believed that at least these features of the deposition system/process result in a high level of dimensional consistency (e.g., highly consistent thicknesses) in each of the deposited layers along the length of the target rod, which in turn results in a high level of dimensional control/tolerance in the final laser waveguide following stretching. In particular it is believed that a higher level of dimensional consistency may be achieved utilizing the deposition discussed herein as compared to other waveguide formation processes such as those involving planar vapor deposition targets.

Figure 1:
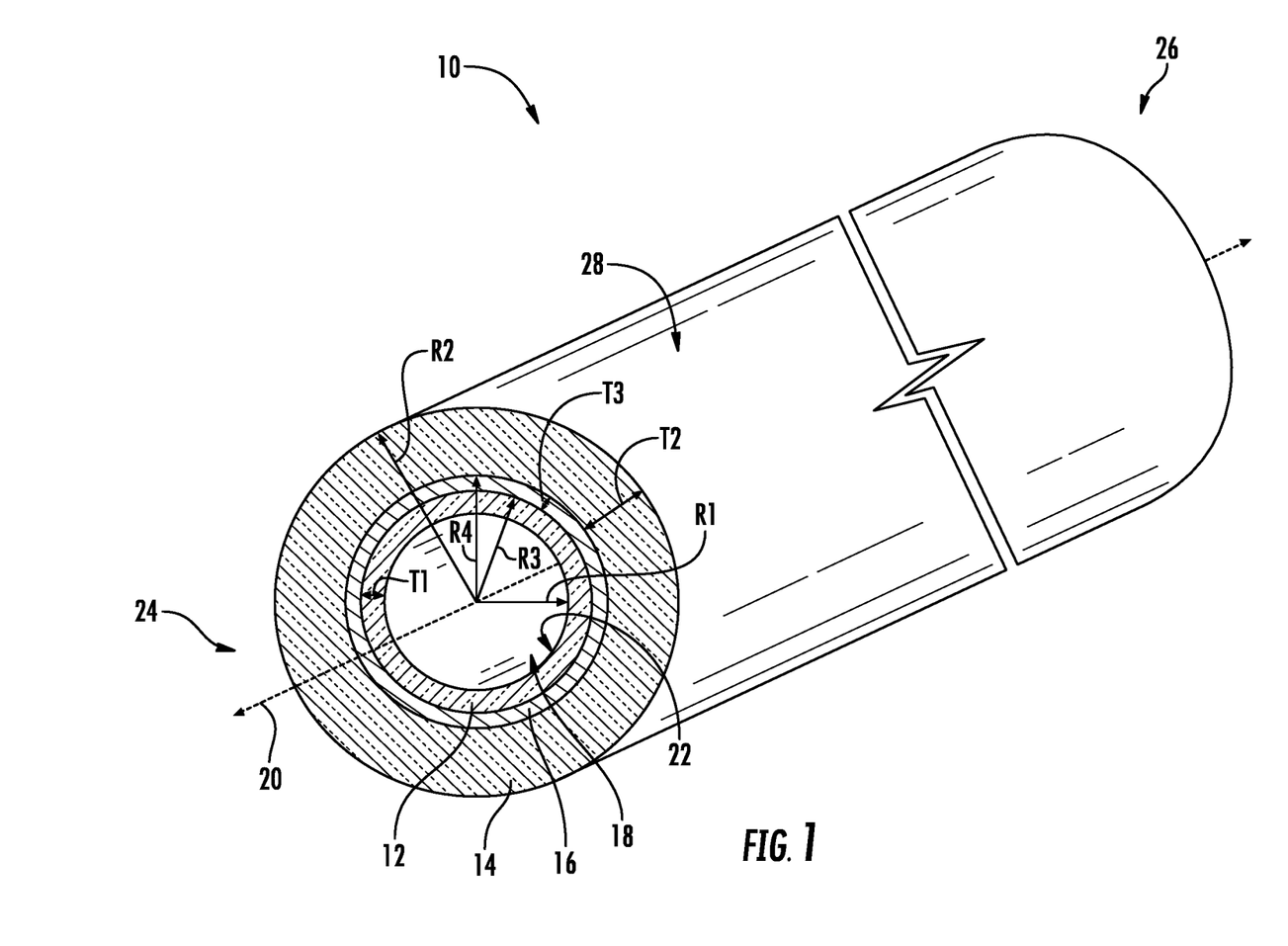
FIG. 1 shows a laser waveguide according to an exemplary embodiment.

Referring to FIG. 1, a laser waveguide, such as laser optical tube body 10, is shown according to an exemplary embodiment. Laser optical tube body 10 includes an inner cladding layer 12, an outer cladding layer 14 and a core 16 located in between the inner cladding layer 12 and outer cladding layer 14. In general, cladding layers 12 and 14 and core 16 are each formed from a glass material, and each layer includes a material or dopant which provides the layer with the properties discussed herein. In specific embodiments, cladding layers 12 and 14 and core 16 are formed from an amorphous silica glass material (e.g., a sintered silica glass material) that includes dopants to provide each layer with the properties discussed herein. In various embodiments, cladding layers 12 and 14 and/or core 16 may be at least 50% by weight $SiO_2$, at least 60% by weight $SiO_2$, at least 70% by weight $SiO_2$, at least 80% by weight $SiO_2$, at least 90% by weight $SiO_2$, at least 99% by weight $SiO_2$, 99.9% by weight $SiO_2$, or at least 99.99% by weight $SiO_2$.

In general, laser optical tube body 10 is an optical waveguide that transmits light along the length of laser optical tube body 10 within core 16 via total internal reflection (TIR). As will be understood, total internal reflection is achieved through an arrangement in which the index of refraction of the material within core 16 is greater than index of refraction of the material of inner cladding layer 12 and greater than the index of refraction of the material of outer cladding layer 14. In this arrangement, light is guided within core 16 by cladding layers 12 and 14 which trap light in core 16 through total internal reflection caused by the index of refraction difference between the core and the cladding layers.

In specific embodiments, inner cladding layer 12 and outer cladding layer 14 are formed from a silica glass material that includes one or more dopant material (e.g., fluorine dopant, boron dopant, combination of fluorine/boron dopant, etc.) that decreases the index of refraction of the silica based cladding layers relative to that of core 16. In other embodiments, core 16 is formed from a silica glass material that includes one or more dopant material that increases the index of refraction of core 16 relative to that of cladding layers 12 and 14, and in some such embodiments, cladding layers 12 and 14 may be doped (e.g., down doped), and in other embodiments, cladding layers 12 and 14 are undoped. As will be understood, the concentration of dopant(s) located in the core and/or one or more of the cladding layers is modified to cause the core index to be higher than one or both of the cladding indices.

Core 16 of laser optical tube body 10 acts as a laser gain medium and includes one or more laser-active material. In specific embodiments, core 16 is formed from a silica glass material (e.g., a high purity sintered silica glass material) doped with one or more laser-active material. As will be understood, laser optical tube body 10 receives light from a light source (e.g., a pumping laser diode), and the laser active material of core 16 is stimulated by the light from the light source to emit the coherent light allowing optical tube body 10 to act as a laser. The laser active material of core 16 may be any known laser active material, including rare earth elements and transition elements. In specific embodiments, the laser active material of core 16 may include at least one of the elements neodymium, ytterbium, erbium, thulium, praseodymium, holmium, cerium, yttrium, gadolinium and titanium, and specifically, core 16 is a silica glass material doped with one or more rare earth ions and/or transition metal ions.

As shown in FIG. 1, laser optical tube body 10 includes a hollow area, bore or channel, such as central channel 18, which surrounds a longitudinal central axis 20. In this arrangement, inner cladding layer 12 surrounds longitudinal central axis 20 and is the innermost layer of laser optical tube body 10 such that inner cladding layer 12 includes an inner surface 22 that faces central axis 20 and that defines central channel 18. In contrast to some optical fiber designs which include various layers of porous material, channel 18 is a relatively large open area (e.g., in relation to the cross-sectional size of laser optical tube body 10) that extends between first end 24 and second end 26 of laser optical tube body 10. In such embodiments, the contiguous channel 18 between ends 24 and 26 allows for a continuous flow of cooling fluid through channel 18. As shown in FIG.

1, central channel 18 is a substantially circular, cylindrical bore (e.g., radius varies less than 1% at different longitudinal and radial positions along laser optical tube body 10), but in other embodiments, central channel 18 may have a wide variety of cross-sectional shapes, including elliptical, square, rectangular, other polygonal, triangle, star-shaped, etc.

As shown in FIG. 1, core 16 surrounds and is located outside of inner cladding layer 12, and outer cladding 14 surrounds and is located outside of core 16. In the specific arrangement shown in FIG. 1, inner cladding layer 12 is an annular layer which circumscribes central channel 18, core 16 is an annular layer which circumscribes inner cladding layer 12 and outer cladding layer 14 is an annular layer which circumscribes core 16. As will be discussed in more detail below, in particular embodiments, cladding layers 12 and 14 and core 16 are formed from sequentially deposited layers of glass soot (e.g., silica soot) which are sintered as individual layers or as a bulk soot tube following deposition to form the glass layers in the finished laser optical tube body 10. Thus, this process forms a waveguide in which inner surface 22 of cladding layer 12 faces central channel 18, an inner portion of core 16 contacts and transitions into an outer portion of inner cladding layer 12, and an inner portion of outer cladding 14 contacts and transitions into an outer portion of core 16.

In various embodiments, the various layers of laser optical tube body 10 are sized relative to each other in a manner that is believed to provide a variety of functions, including low TIR losses, improved dimensional consistency, improved light coupling with the laser diode, etc. As shown in FIG. 1, inner cladding layer 12 has an average thickness in the radial direction, shown as T1, outer cladding layer 14 has an average thickness in the radial direction, shown as T2, and core 16 has an average thickness in the radial direction, shown as T3. In various embodiments, T1 is greater than T3, and T2 is greater than T3. In various embodiments, T2 is at least twice T1, and in such embodiments, the low thickness of inner cladding 12 facilitates transfer of heat to the cooling fluid located in central channel 18. In particular embodiments, T1 is between 1 µm and 1 mm, and specifically between 1 µm and 10 µm, and T3 is between 10 µm and 200 µm and specifically is less than 100 µm. In particular embodiments, T2 is between 1 mm and 100 mm, and specifically between 1 mm and 10 mm.

In various embodiments, central channel 18 is configured to carry or transport a cooling fluid (e.g., water) which removes heat from laser optical tube body 10 during operation, and thus in various embodiments, central channel 18 is sized relative laser optical tube body 10 to provide a sufficient level of heat transfer away from laser optical tube body 10 during operation of the laser. As will be understood, maintaining laser optical tube body 10 at a lower temperature during operation avoids or limits heat-induced inefficiencies that may otherwise be experienced. As shown in FIG. 1, central channel 18 has an average radius shown as R1, and outer cladding layer 12 has an outer surface 28 which defines an outermost average radius R2. In various embodiments, laser optical tube body 10 is relatively large (e.g., compared to standard optical fibers that have diameters less than 100 or 200 microns), and in some such embodiments, R2 may be 10s or 100s of millimeters. In specific embodiments, R2 is greater than 5 mm and less than 200 mm, and in some such large diameter embodiments, T3 may be less than 100 µm with the large radius provided by the thickness of cladding 12 and/or 14. In this arrangement, both inner surface 22 and outer surface 28 are substantially cylindrical surfaces. In various embodiments, R1 is a relatively large proportion of R2 to facilitate/improve heat transfer. In specific embodiments, R1 is at least 10% of R2, specifically at least 20% of R2 and more specifically at least 30% of R2.

In various embodiments, the material (e.g., the silica material) of the different layers of laser optical tube body 10 has been processed through one or more cleaning processes that remove various contaminants (e.g., metals, water, etc.) that may cause lower quantum efficiency within the waveguide. In such embodiments, trace amounts of chlorine may be identifiable within one or more layer of laser optical tube body 10 indicating that additional processing has occurred to improve function of the laser optical tube body 10 for laser applications. In various embodiments, the material of one or more of the layers (e.g., cladding layers 12 and 14, and/or core 16) of laser optical tube body 10 includes between 0.1 ppm and 100 ppm chlorine.

In various embodiments, core 16 is formed to improve laser operation in a variety of ways. As shown in FIG. 1, core 16 has an inner radius R3 and an outer radius R4. In various embodiments, the ratio of R4 to R3 is relatively small. In specific embodiments, R4/R3 is between 1.001 and 1.5. The largest aspect ratio of the outer radius to the inner radius of core 16 is beneficial because this increases the fraction of output light that is emitted in the lowest-order optical modes. This makes optical shaping of the beam, beam guidance and focusing of the output beam simpler and more efficient in the laser device/system utilizing laser optical tube body 10 and also keeps the divergence angle of the output laser beam to a minimum.

In particular embodiments, cladding layers 12 and 14 and optical core 16 are formed from a silica material, such as a heat or laser sintered silica glass material. In particular embodiments, the silica glass material of laser optical tube body 10 is an amorphous, non-crystalline form of silica. In specific embodiments as discussed herein, amorphous silica is less than 1% crystalline, specifically less than 0.5% crystalline and more specifically is less than 0.1% crystalline. In other embodiments, one or more layer of laser optical tube body 10 may be formed from any suitable waveguide material, such as other glass materials, various ceramic materials, crystalline materials, etc. In specific embodiments, one or more layer or portion of laser optical tube body 10 may include other materials such as fluorozirconate, fluoroaluminate, and chalcogenide glasses, as well as crystalline materials, such as sapphire.

Figure 2:
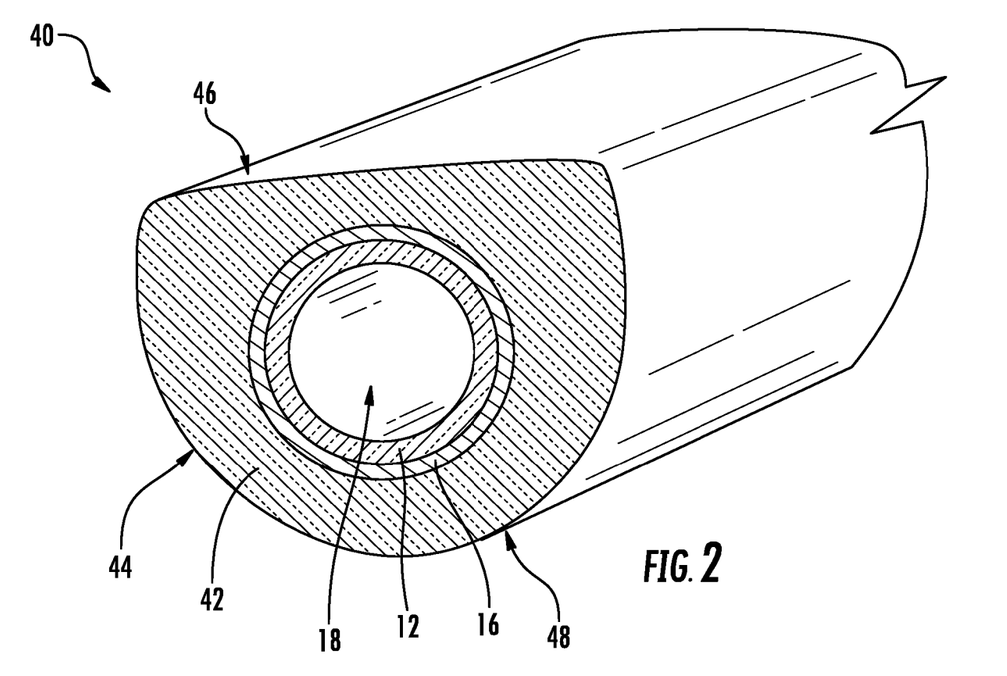
FIG. 2 shows a laser waveguide according to another exemplary embodiment.

Referring to FIG. 2, a laser waveguide, such as laser optical fiber 40, is shown according to another exemplary embodiment. Laser optical fiber 40 is substantially the same as laser optical tube body 10, except as discussed herein. In particular, laser optical fiber 40 includes an outer cladding layer 42 which has an outer surface 44 that is a non-circularly-symmetric, non-rectangular outer surface. In general, the non-circular cross-sectional shape of laser optical fiber 40 is believed to increase the amount of the pumping diode light that is forced out of outer cladding layer 42 to traverse core 16 and consequently to increase interaction of the pumping light with laser gain medium of core 16.

In the embodiment shown, outer surface 44 has a substantially planar portion 46 and a curved section 48 forming a substantially partial circular or semi-circular shape in cross-section. In this arrangement, the curved section 48 extends between opposing ends of planar portion 46 such that outer cladding layer 42 surrounds inner cladding layer 12, core 16 and central channel 18. In other embodiments, outer cladding layer 42 may have other non-circularly shaped outer surfaces, including polygonal surfaces and star-shaped surfaces.

Figure 3:
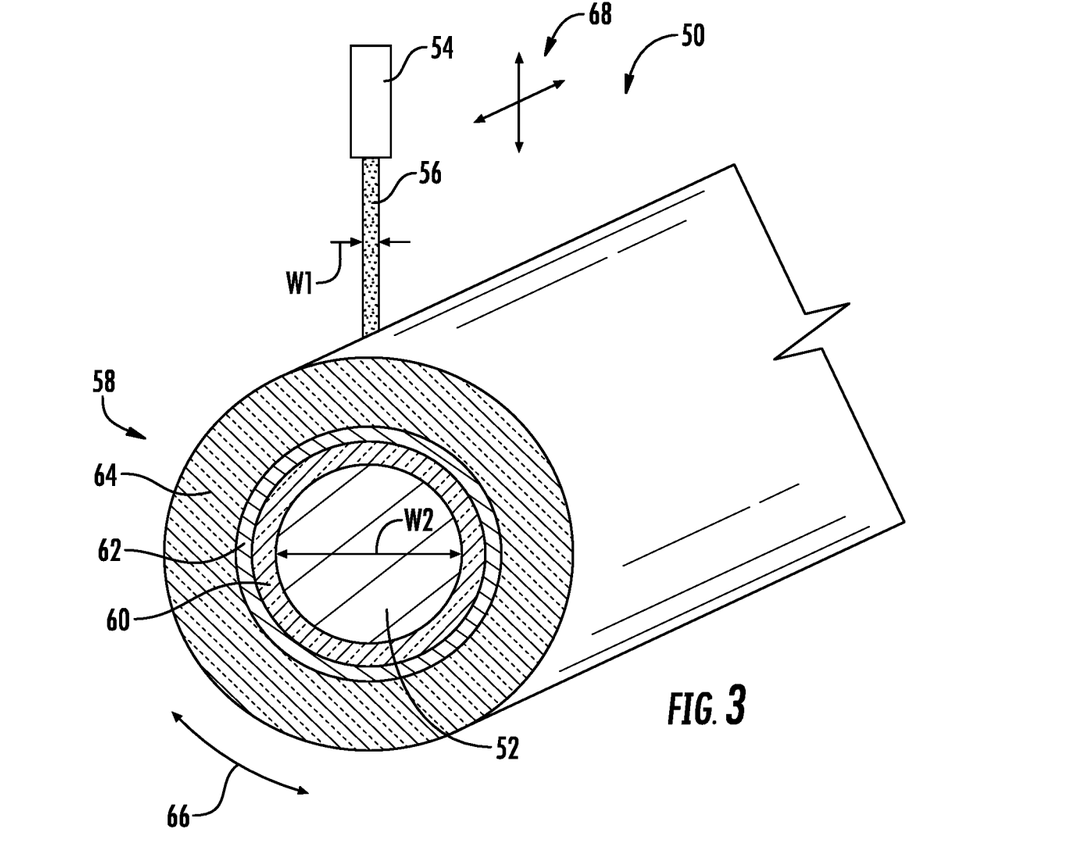
FIG. 3 shows a system for depositing soot layers for the formation of a laser waveguide according to an exemplary embodiment.

Referring to FIG. 3, a system and method for forming laser optical tube body 10 is shown and described. As shown in FIG. 3, system 50 includes a deposition device or target rod, shown as deposition rod 52. System 50 includes a soot generating device, shown as soot burner 54 (e.g., a flame hydrolysis burner), that directs one or more streams of glass soot particles 56 onto deposition rod 52. In general, soot burner 54 may be one or more soot generating device that is configured to deliver soot particles 56 having the different materials or dopants to provide the various functions of inner cladding 12, outer cladding 14 and core 16, as discussed above.

In various embodiments, deposition rod 52 may be formed from a suitable material, including various ceramic materials, from alumina, etc. Further, the outer surface of deposition rod 52 defines the shape of central channel 18, and thus, deposition rod 52 may have a non-cylindrical outer surface to form a non-cylindrically shaped central channel 18.

In general, to form laser optical tube body 10, a multi-layered soot structure 58 having glass soot layers which, following sintering, will become inner cladding 12, outer cladding 14 and core 16 as discussed above. Specifically, as shown in FIG. 3, soot burner 54 is operated to deliver a first stream of glass soot particles to deposition rod 52 which forms a first layer 60 of glass soot particles surrounding deposition rod 52, and following sintering this first layer 60 of glass soot particles becomes inner cladding layer 12. Next, after formation of first layer 60 of glass soot particles, soot burner 54 is operated to deliver a second stream of glass soot particles toward deposition rod 52 forming second soot layer 62 surrounding first layer 60. The second stream of glass soot particles includes a laser-active material such that following sintering this second layer 62 of glass soot particles becomes core 16. After formation of the second layer 62 of glass soot particles, soot burner 54 is operated to deliver a third stream of glass soot particles toward deposition rod 52 forming third soot layer 64 surrounding second layer 62. Following sintering, this third layer 64 of glass soot particles becomes outer cladding layer 14. As discussed below, in other embodiments, all 3 layers (inner clad, core, outer clad) are deposited, chemically cleaned and sintered together, and then may be redrawn to smaller diameter and longer length.

In various embodiments, system 50 is configured to form highly even, dimensionally consistent soot layers 60, 62 and 64. In various embodiments, deposition rod 52 is rotated about its central longitudinal axis, as represented by arrow 66, during delivery of soot stream 56. In other embodiments, soot burner 54 may be rotated about deposition rod 52 instead of or in addition to rotation of deposition rod 52. System 50 is configured to cause relative translational movement between soot generating device 54 and deposition rod 52 during delivery of soot stream 56, as represented by arrows 68. In various embodiments, deposition rod 52 and/or soot generating device 54 are configured for translational movement relative to the other such that relative translational move 68 is provided. Thus, by rotation and translation, each soot layer is built up and any point defects or unevenness in soot deposition of a particular pass are smoothed out during subsequent passes.

Further, soot generating device 54 is configured (e.g., through sizing, shape and positioning of output holes in a burner manifold) to generate a relatively small sized soot stream, which Applicant has found improves dimensionally consistent soot layer deposition. As shown in FIG. 3, soot stream 56 has a maximum width, W1, and deposition rod 52 has a maximum width, W2. In general, W1 is less than W2 and more specifically is less than 20% of W2. By forming a soot stream 56 that has a width that is substantially smaller than the width of deposition rod 52, Applicant has found that more even (e.g., consistent thickness) soot layers may be deposited. As shown in the embodiment of FIG. 3, deposition rod 52 is circular in cross-sectional shape such that W2 is a diameter, and in particular embodiments, W2 is between 1 and 3 inches. In addition, deposition rod 52 may be about 1 meter long.

In various embodiments, the laser waveguide disclosed herein are formed by a system that utilizes one or more glass soot generating devices (e.g., a flame hydrolysis burner) that is directed or aimed to deliver a stream of glass soot particles on to a target rod. As noted above, the various soot layers discussed herein may include one or more dopant. In the example of a flame hydrolysis burner, doping can take place in situ during the flame hydrolysis process by introducing dopant precursors into the flame. In a further example, such as in the case of a plasma-heated soot sprayer, soot particles sprayed from the sprayer can be pre-doped or, alternatively, the sprayed soot particles can be subjected to a dopant-containing plasma atmosphere such that the soot particles are doped in the plasma. In a still further example, dopants can be incorporated into soot layers prior to or during sintering of the soot layers. Example dopants include elements from Groups IA, IB, IIA, IIB, IIIA, IIIB, IVA, IVB, VA, VB and the rare earth series of the Periodic Table of Elements. In various embodiments, the silica soot particles may be doped with a variety of materials, including germania, titania, alumina, phosphorous, rare earth elements, metals and fluorine. Laser active dopants that are added to core 16 may be any known laser active material, including rare earth elements, including neodymium, ytterbium, erbium, thulium, praseodymium, holmium, cerium, yttrium, gadolinium and titanium.

Figure 4:
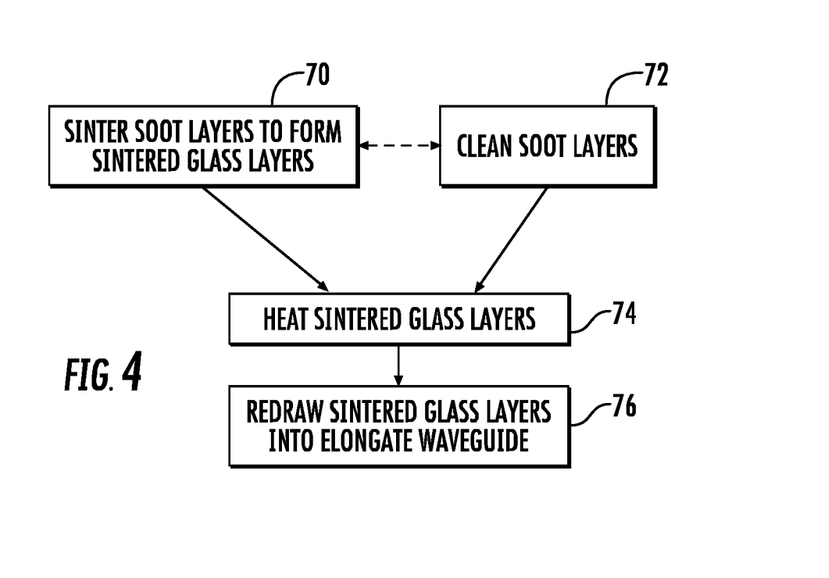
FIG. 4 shows a process for forming a laser waveguide according to an exemplary embodiment.

Referring to FIG. 4, a process for forming laser optical tube body 10 from multi-layered soot structure 58 is shown according to an exemplary embodiment. To form laser optical tube body 10 from multi-layered soot structure 58, the glass soot of layers 60, 62 and 64 are sintered (e.g., fully or partially densified) into glass layers formed for the glass soot material as shown at step 70. In some embodiments, soot layers 60, 62 and 64 are all deposited sequentially, and then all of soot layers 60, 62 and 64 are sintered together. In other embodiments, sintering may occur immediately after deposition of each soot layer. For example, in such embodiments, soot layer 60 may be sintered prior to deposition of soot layer 62, and soot layer 62 may be sintered prior to deposition of soot layer 64. In various embodiments, deposition rod 52 is removed from soot layers 60, 62 and 64 prior to sintering. Soot layers 60, 62 and 64 may be sintered utilizing any suitable sintering process or system. In one embodiment, soot layers 60, 62 and 64 are sintered within a sintering furnace. In another embodiment, soot layers 60, 62 and 64 are sintered via heating caused by a sintering laser.

In some embodiments, as shown at step 72, soot layers 60, 62 and 64 are cleaned using one or more processes that remove various contaminants that may cause lower quantum efficiency within the laser optical tube body 10 formed from multilayer soot structure 58. In one embodiment, soot layers 60, 62 and 64 are exposed to a chlorine-containing gas and drying gases which remove various contaminants, such as water and metals. In some embodiments, soot layers 60, 62 and 64 are exposed to a chlorine-containing gas prior to sintering, and in other embodiments, soot layers 60, 62 and 64 are exposed to the chlorine-containing gas during sintering (e.g., within a sintering furnace). In specific embodiments, sintering and cleaning of soot layers 60, 62 and 64 may be performed in a sintering furnace of the type used to form standard communications optical fibers while using the same or similar drying and cleaning gas flows. Chlorine-containing gases include $Cl_2$, $SiCl_4$, and $CCl_4$.

In some embodiments, the sintering of soot layers 60, 62 and 64 results in sintered glass layers that are thicker and shorter than desired for laser optical tube body 10. In such embodiments, at step 74, the sintered glass layers are heated above the melting temperature of the sintered glass. At step 76, the heated sintered glass layers are elongated (e.g., via pulling, redrawing, etc.) and then rapidly quenched such that laser optical tube body 10 having the desired outer diameter is formed. In various embodiments, elongation also increases the length, such that the final length of laser optical tube body 10 is sized as needed for a particular application. In various embodiments, the length of laser optical tube body 10 is less than 1 m and greater than 1 mm, and in other embodiments laser optical tube body 10 is less than 3 m and greater than 1 m. In some embodiments, to maintain the desired size and shape of the open central channel during elongation, centerline pressure control may be used to maintain the desired inner diameter of central channel 18 formed during the elongation process. In some embodiments, it is believed that the elongation process forms a laser optical tube body 10 having low attenuation due to the stretching experienced during the elongation step.

In some embodiments, the core material may crystalize initially during sintering due to the high levels of dopants, but, by utilizing a redraw process with rapid quenching, recrystallization of core 16 is avoided such that core 16 is a substantially amorphous glass layer. In particular embodiments, elongation may result in a laser optical tube body 10 that is longer than needed for a particular laser device. In such embodiments, multiple, shorter laser optical tube bodies 10 may be cut from the longer waveguide formed during the redraw process.

Figure 5:
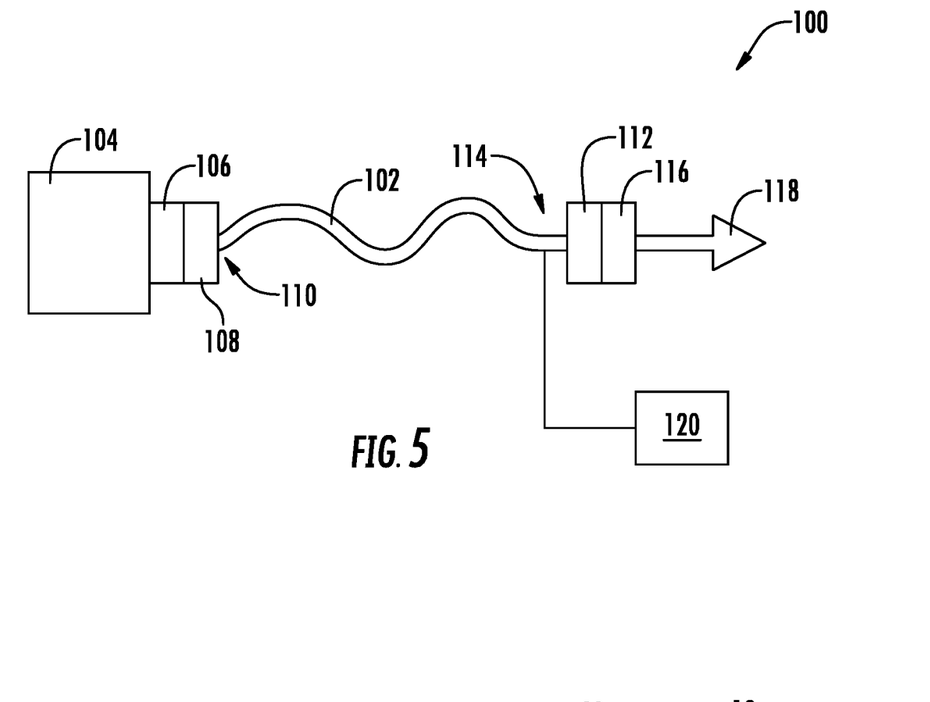
FIG. 5 shows a laser system including a laser waveguide according to an exemplary embodiment.

FIG. 5 shows a laser system 100 including a laser waveguide lasing medium, shown as laser waveguide 102, according to an exemplary embodiment. It should be understood that laser waveguide 102 may be any laser waveguide lasing medium or any laser waveguide, such as laser optical tube body 10, as discussed herein and may be formed via any of the processes discussed herein. Laser system 100 includes a power source, shown as pumping diode 104, and input coupling optics 106 coupling the pumping diode 104 to laser waveguide 102. In general, input coupling optics 106 are configured to deliver light from pumping diode 104 into laser waveguide 102.

Laser system 100 includes an optical feedback system coupled to laser waveguide 102. In general, the optical feedback system of laser system 100 includes one or more component configured to reflect light from pumping diode 104 within laser waveguide 102. In the particular embodiment shown in FIG. 5, the optical feedback system of laser system 100 includes a reflector 108 located at a first end 110 of laser waveguide 102 and an output coupler 112 located at a second end 114 of laser waveguide 102. Reflector 108 is a highly reflective component and directs a large part or all of the light that hits it back within laser waveguide 102. Output coupler 112 is a partially reflective component such that a portion of the light that hits it is reflected back into laser waveguide 102 and a portion of the light is permitted to exit output coupler 112. As will be understood, by reflecting light within laser waveguide 102 between reflector 108 and output coupler 112 the interaction between the laser active material of laser waveguide 102 and the light is increased facilitating amplification of light within laser system 100.

Referring to FIG. 5, laser system 100 includes output beam optics 116. Output coupler 112 is coupled to output beam optics 116 such that the portion of the laser light that is permitted to exit output coupler 112 is directed to output beam optics 116. In general, output beam optics 116 includes various components to modify the output light from output coupler 112 to generate laser beam 118 as needed for the desired application of laser system 100. In various embodiments, output beam optics 116 may include one or more lens, mirror, collimating device, etc. configured to generate laser beam 118 as desired for a particular application.

In particular embodiments, laser system 100 includes a cooling system 120. Cooling system 120 is configured to deliver cooling fluid to a hollow area, such as central channel 18, of laser waveguide 102. During operation of laser system 100, heat is generated within laser waveguide 102, and cooling fluid acts to cool laser waveguide 102 through the inner surface. In specific embodiments, a low thickness inner cladding 12 facilitates a high level of heat transfer to the cooling fluid within the hollow central area.

Figure 6A:
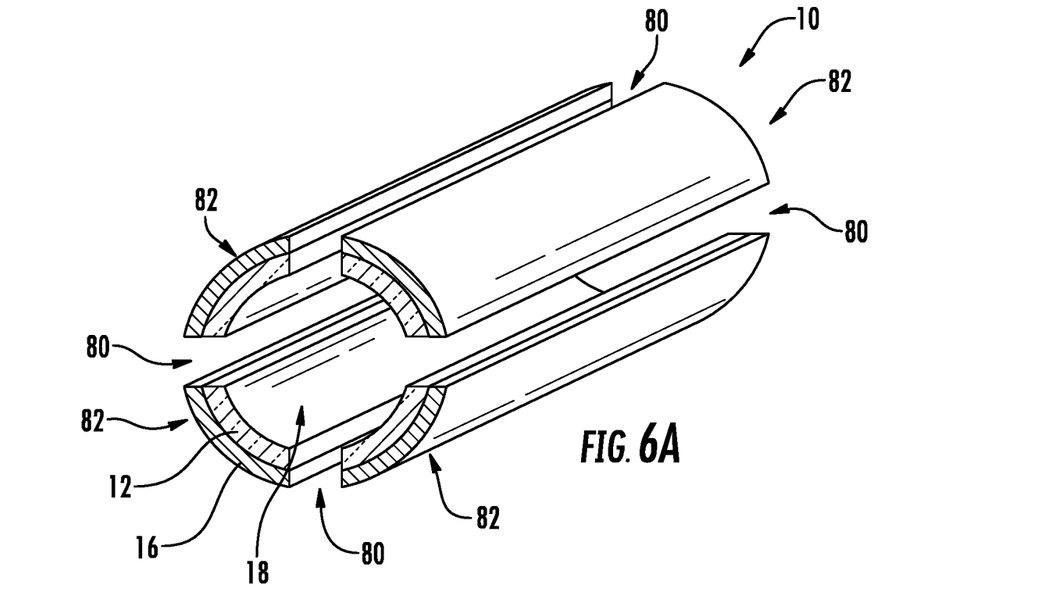
FIGS. 6A-6C show a process for forming a planar laser waveguide according to an exemplary embodiment.
Figure 6B:
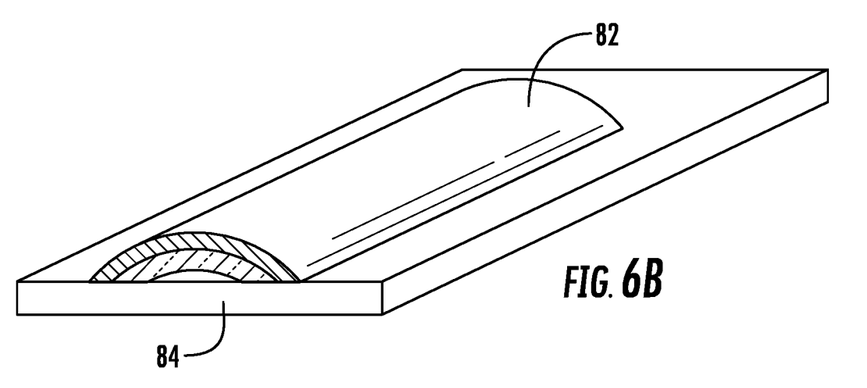
Figure 6C:
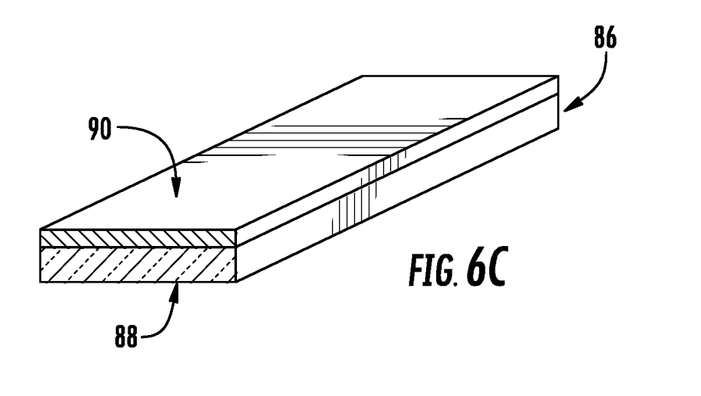

Referring to FIGS. 6A-6C, a process for forming a planar laser waveguide is shown according to an exemplary embodiment. As shown in FIG. 6A, a laser optical tube body 10 is formed as discussed above regarding FIGS. 3 and 4 (for ease of illustration outer cladding layer 14 is not shown in FIGS. 6A-6C). Then, one or more cuts 80 are formed radially from central channel 18 to outer surface 28 and longitudinally along laser optical tube body 10. The number and positioning of cuts 80 determines the width of the final planar waveguide. As shown in FIG. 6A, following cutting, each waveguide section 82 includes a portion of inner cladding 12 and of core 16, and also includes a curvature in the circumferential direction corresponding to the circumferential shape of laser optical tube body 10 prior to cutting.

As shown in FIG. 6B, following cutting, waveguide section 82 is supported by an appropriate substrate 84 (e.g., a plate of refractory material). While supported by substrate 84, waveguide section 82 is heated (e.g., within a furnace) to a high temperature (e.g., above a glass transition temperature of the material of waveguide section 82, above a softening temperature of the material of waveguide section 82, to between 1500-2000 degrees C., etc.). While at this high temperature, the waveguide section 82 is shaped (e.g., through sagging under gravity) such that the circumferential curvature is decreased, and in a particular embodiment, the waveguide section 82 is shaped (e.g., through sagging under gravity or through pressing between opposing plates) such that the circumferential curvature is eliminated such that a substantially planar waveguide 86 is formed as shown in FIG. 6C.

In various embodiments, waveguide section 82 is heated for between 0.15 hours and 1 hour and more specifically for between 0.25 hours and 0.5 hours to achieve the desired flattening. Following flattening, planar waveguide 86 is cut and polished to achieve the desired final waveguide dimensions. As shown in FIG. 6C (and in contrast to laser optical tube body 10), waveguide 86 has a substantially planar lower surface 88 and a substantially planar upper surface 90. As used herein, substantially planar surfaces are those that have a radius of curvature greater than 1 m, more specifically greater than 10 m.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A method of forming a laser waveguide comprising:
    delivering a first stream of glass soot particles from a soot generating device to a target rod such that a first layer of glass soot particles is formed surrounding the target rod;
    delivering a second stream of glass soot particles from the soot generating device toward the target rod after formation of the first layer of glass soot particles, wherein the second stream of glass soot particles forms a second layer of glass soot particles and includes a laser-active material;
    delivering a third stream of glass soot particles from the soot generating device toward the target rod after formation of the second layer of glass soot particles such that a third layer of glass soot particles is formed; and
    sintering the first, second and third layers of glass soot particles such that first, second and third sintered glass layers are formed from the first, second and third glass soot layers, respectively,
    wherein a diameter of the first stream, the second stream, and the third stream are each less than a diameter of the target rod.

2. The method of claim 1, wherein sintering includes sintering the first layer of glass soot particles before formation of the second layer of glass soot particles.

3. The method of claim 1, wherein sintering includes sintering the second layer of glass soot particles before formation of the third layer of glass soot particles.

4. The method of claim 1, wherein the second layer of glass soot particles is formed surrounding the first layer of glass soot particles and the third layer of glass soot particles is formed surrounding the second layer of glass soot particles, wherein the first, second and third layers of glass soot particles are sintered together following formation of the first, second and third layers of glass soot particles.

5. The method of claim 1, further comprising:
    heating the sintered first, second and third sintered glass layers; and
    elongating the sintered first, second and third glass layers following heating to form an elongate glass waveguide having an inner cladding layer formed from the first sintered glass layer, a glass laser gain medium formed from the second sintered glass layer, and an outer cladding layer formed from the third sintered glass layer.

6. The method of claim 5, wherein the inner cladding layer and the outer cladding layer comprise a silica material.

7. The method of claim 6, wherein the glass laser gain medium is a laser-active rare earth material.

8. The method of claim 1, wherein at least one of the first, second and third streams of glass soot particles includes a dopant such that an index of refraction of the sintered second glass layer is greater than the index of refraction of the first sintered glass layer and is greater than the index of refraction of the third sintered glass layer.

9. The method of claim 8, wherein the first, second and third layers of glass soot particles comprise silica soot particles, and wherein the second layer of glass soot particles includes at least one of neodymium, ytterbium, erbium, thulium, praseodymium, holmium, cerium, yttrium, gadolinium and titanium.

10. A method for forming a laser waveguide comprising:
    forming a glass waveguide tube, the waveguide tube comprising:
        an inner cladding layer surrounding a hollow central channel that extends between opposing first and second ends along a length of the waveguide; and
        a laser gain medium surrounding and located outside of the inner cladding layer, the laser gain medium comprising a glass material doped with a laser-active material;
    cutting a section from the glass waveguide tube, wherein the section includes a portion of the inner cladding layer, a portion of the laser gain medium and a curvature in a circumferential direction measured in a plane perpendicular to a longitudinal axis of the section;
    heating the section of the glass waveguide tube to a temperature above a softening temperature of the glass material; and
    shaping the curved section of the glass waveguide while above the glass transition temperature, wherein the curvature in the circumferential direction is decreased during shaping.

* * * * *

UNITED STATES PATENT AND TRADEMARK OFFICE
CERTIFICATE OF CORRECTION

PATENT NO. : 11,114,812 B2
APPLICATION NO. : 16/719058
DATED : September 7, 2021
INVENTOR(S) : Douglas Llewellyn Butler et al.

It is certified that error appears in the above-identified patent and that said Letters Patent is hereby corrected as shown below:

On the Title Page

On page 2, in Column 2, item (56), Other Publications, Line 5, delete "Seaching" and insert -- Searching --, therefor.

On page 2, in Column 2, item (56), Other Publications, Line 13, delete "(Mar. 7, 2016." and insert -- (Mar. 7, 2016). --, therefor.

On page 2, in Column 2, item (56), Other Publications, Line 15, delete "Enlgish" and insert -- English --, therefor.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*